United States Patent Office 3,549,291
Patented Dec. 22, 1970

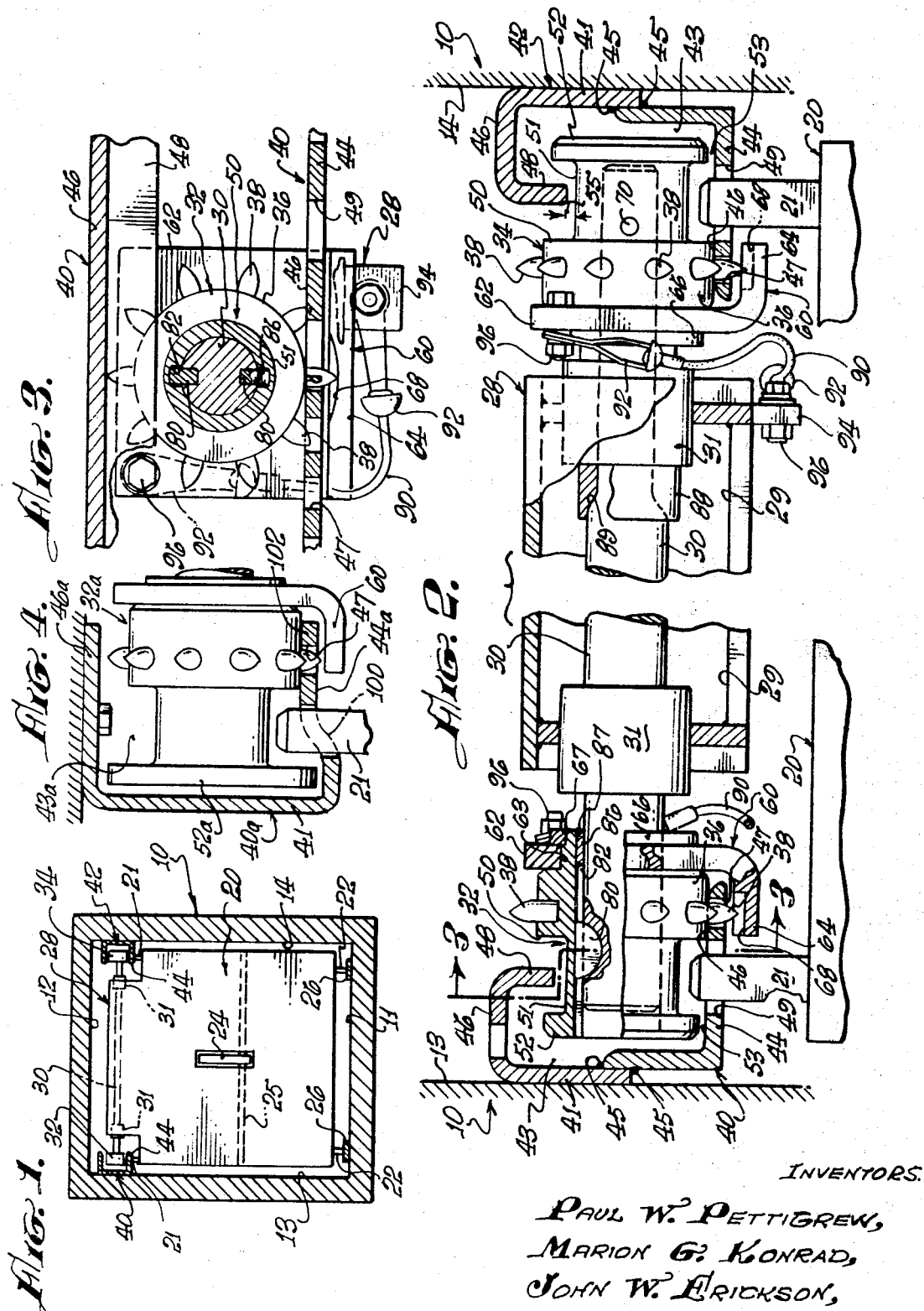

3,549,291
RETAINING STRUCTURE FOR LOAD DIVIDING GATE SUSPENSION
Paul W. Pettigrew, Seal Beach, Marion G. Konrad, Hacienda Heights, and John W. Erickson, Huntington Beach, Calif., assignors to Preco, Inc., Los Angeles, Calif., a corporation of California
Filed Apr. 15, 1968, Ser. No. 721,511
Int. Cl. B61d 45/00
U.S. Cl. 105—376                    10 Claims

ABSTRACT OF THE DISCLOSURE

Conventional rail suspensions for load dividing gates in railway freight cars and the like are potentially capable of releasing the gate in case of failure of the normal sprocket retainer, failure of one or more sprocket teeth, or failure of the main suspension shaft.

The present support structure avoids those risks by positively trapping the shaft rollers between upper and lower rail flanges. The rail structure also typically acts as primary sprocket retainer, or retains the sprocket teeth in rail engagement if the conventional retainer should fail. Danger from shaft failure is avoided by coupling the gate to each of the trapped rollers via a normally slack cable or the like and a member journaled with respect to the roller.

---

This invention concerns load dividing gates for transport vehicles, and relates more particularly to the suspension mechanism by which such gates are moved to a selected working position in the vehicle lading compartment.

It is common practice to mount a pair of parallel horizontal rails on opposite walls of the lading compartment and to suspend the gate from a cross shaft having rollers at its ends which roll on the respective rails. The gate may be supported directly by bearings near the shaft ends or may be suspended from the shaft by means of intermediate structure that permits swinging movement about a vertical axis and translational movement longitudinally of the shaft. Sprocket wheels are commonly associated with the rollers and engage defining apertures in the rails to maintain the shaft perpendicular to the rails at it rolls along them. One sprocket wheel may be slidingly keyed to the shaft to accommodate variations in spacing between the two rails.

Several mechanisms have been devised to retain the sprockets of such a gate suspension system in engagement with the rail apertures. However, even a well designed retainer mechanism may occasionally fail. Also, under certain conditions one or more teeth of a sprocket may be broken, permitting one end of the shaft to slide along its rail. In previous structures such failure of a sprocket tooth might allow the shaft to swing about one end far enough to free the other end entirely from its rail.

An important object of the present invention is to provide shaft retaining mechanism that will reliably maintain both ends of the cross shaft in supported relation to the rails even under extremely abnormal conditions, including failure of one or more sprocket teeth.

A further aspect of the invention provides structure for reliably supporting the gate in case of breakage of the cross shaft.

The invention further provides sprocket retainer structure capable of maintaining engagement of the sprocket teeth with the rail apertures. That aspect of the present invention is preferably, but not necessarily, utilized as an extra safety device in combination with a conventional retainer structure, such as that described and claimed in Pat. 3,358,617, issued to John W. Erickson, one of the present applicants, and assigned to the same assignee as the present application.

Those objectives are typically accomplished, in accordance with the invention, by providing each rail with an upper flange extending in spaced relation above the roller and terminating in a downwardly directed lip that spacedly encloses the periphery of a radial flange formed essentially integrally with the roller. The upper and lower flanges of such a rail may be described as defining, with the vertical rail web, a longitudinal chamber having a mouth that is restricted by the lip. The roller flange is trapped within that chamber, preventing the roller from becoming detached from the rail. The chamber mouth may be formed by an offset portion of either rail flange.

If one roller is slidable on the shaft, the key structure is designed to positively prevent the roller from leaving the shaft.

To protect the suspension against shaft breakage, a flexible cable or chain at each end of the shaft is connected between the gate structure and a member journaled directly on the roller. That member may be a sprocket retainer of the type described in the above identified patent.

A full understanding of the invention and of its further objects and advantages will be had from the following description of an illustrative manner in which it may be carried out. The particulars of that description, and of the accompanying drawings which form a part of it, are intended only as illustration and not as a limitation upon the scope of the invention, which is defined in the appended claims.

In the drawings:

FIG. 1 is a schematic section through the lading compartment of a transport vehicle, showing a load dividing gate and an illustrative suspension mechanism to which the invention pertains;

FIG. 2 is a fragmentary section corresponding to an upper portion of FIG. 1 at enlarged scale and representing an illustrative embodiment of the invention;

FIG. 3 is a section on line 3—3 of FIG. 2; and

FIG. 4 is a section corresponding to a portion of FIG. 2 and representing a modification.

In FIG. 1 a typical freight vehicle compartment is shown in transverse section at 10 with a floor 11, ceiling 12 and sidewalls 13 and 14. A load dividing gate 20 is shown in elevation in a typical working position, extending transversely of the vehicle compartment. The gate is releasably locked in the selected working position by projecting the two upper locking pins 21 and the two lower pins 22. Those pins are controlled by a handle 24, which typically rotates a shaft 25, coupled to the respective pins by linkage mechanisms not explicitly shown.

When released by retraction of locking pins 21 and 22, gate 20 is supported for movement longitudinally of the compartment by the cross shaft 30. As shown in FIG. 1, shaft 30 is journaled directly on the gate by the bearings 31. Alternatively, bearings 31 may be mounted on a cross beam, indicated at 28 in FIGS. 2 and 3, with the gate suspended by swivel structure from a carriage movable longitudinally of that beam, as on the beam tracks 29. Such carriage and swivel structure is well known and need not be shown explicitly.

The ends of shaft 30 carry the rollers 32 and 34, which roll on the horizontal flanges 44 of the respective rails 40 and 42. Those rails are rigidly mounted on the vehicle sidewalls or ceiling and extend continuously throughout any desired portion of the vehicle compartment. Rail flanges 44 are typically apertured to receive the upper locking pins 21 at a plurality of gate working positions, and corresponding apertures for lower locking pins 22 may be formed in rail members 26, set in the vehicle floor. For some installations the gate is formed in two sections which are independently mounted on two sets of parallel rails, the two inner rails being mounted on the ceiling near the longitudinal center plane of the compartment.

As illustratively shown in FIG. 2, each of the gate supporting rails 40 and 42 comprises a vertical web portion 41, by which it may be mounted on the vehicle sidewall and which need not be continuous, the lower horizontal flange 44, already referred to, and the upper horizontal flange 46, with which the present invention is more specifically concerned. Each of the rails may be constructed from an upper channel member and a lower angle member, which are welded together at 45 to form an effectively integral unit. However, the rail structures may be formed in any convenient manner and they may have a wide variety of detailed configurations without departing from the proper scope of this invention.

The rollers 32 and 34 have cylindrical load supporting faces 36 which ride the upper faces 46 of rail flanges 44. A toothed sprocket is associated with each roller, forming a wheel assembly, at least the sprocket being rotatively fixed with respect to the shaft. As shown, the sprockets are integral with the rollers, and are formed by mounting sprocket teeth 38 in radial bores in the rollers, projecting through surfaces 36. The teeth engage complementary rail formations which comprise the longitudinally spaced defining apertures 47 in rail flanges 44. As the gate is moved along the rails, rotation of the shaft and sprockets maintains the shaft axis and hence also the cross beam 28 or the gate itself at a uniform transverse angle, normally perpendicular to the rails.

The rollers have deep channels 50 with flat bottoms 51 axially outward of support surfaces 36. Those channels provide clearance for the ends of locking pins 21, which project through the locking apertures 49 in rail flanges 44 to lock the gate in a selected working position. Roller channels 50 terminate in the radial flanges 52, whose periphery is preferably slightly spaced from rail flange 44, as indicated at 53.

In accordance with the invention, upper rail flange 46 extends inwardly from the vehicle wall in spaced relation above the periphery of roller flange 52, and terminates in the downwardly directed lip 48. That lip extends deeply into roller channel 50 in spaced relation to its sidewalls. The lower edge of lip 48 is spaced from the bottom of channel 50 by a distance 55, indicated at the right of FIG. 2. That spacing is preferably large enough to accommodate any irregularities in the rail dimensions, but small enough to positively limit upward movement of the roller relative to the rail and thereby maintain reliable engagement of sprocket teeth 38 in rail apertures 47. Also, rail lip 48 forms a restricted mouth for the longitudinal chamber 43 that is defined by the two rail flanges and the rail web. That mouth of limited width traps the roller flange within the chamber, positively preventing the roller from leaving the rail. Hence, if one or more of the teeth 38 should be broken, permitting the roller to slide longitudinally of the rail, lip 48 reliably holds the roller on the rail. Hence there is no possibility, even under the rare circumstance of sprocket failure, that gate supporting shaft 30 might come free of the rails.

In accordance with a further aspect of the invention, the sprocket retaining function of rail lip 48 is not employed as primary sprocket retainer, but as a secondary safety mechanism in case of failure of a primary keeper. Such a primary retaining mechanism is illustratively shown in FIGS. 2 and 3 as the one-piece keeper 60. That keeper comprises the vertical plate portion 62 with circular opening 63, by which it is effectively journaled directly on the hub of the roller; and the flange portion 64, which extends in closely spaced relation below the edge portion of lower rail flange 44. The collar 66 retains keeper 60 on the roller hub, and is preferably welded in place, as indicated at 67. A recess 68 may be cut in keeper flange 64 to clear the ends of sprocket teeth 38. That one-piece keeper construction eliminates fasteners and minimizes the possibility of human error in its installation. Direct journaling of the keeper on the roller and sprocket insures positive overlap of the keeper to the rail at all times, as more fully described in the above identified patent.

When the described safety rail lip 48 is employed with a primary sprocket retainer, such as keeper 60, the clearance 49 between rail lip 48 and the bottom 51 of channel 50 is preferably somewhat greater than the spacing between flange 64 of keeper 60 and the rail. There is then no possibility of binding at lip 48 despite normal irregularities of the rail, yet failure of the primary keeper for any reason cannot lead to release of the sprocket teeth.

The described roller-trapping function of rail lip 48 requires that both rollers be reliably secured on the ends of shaft 30. One roller 34 and its associated sprocket structure are ordinarily rigidly secured to the shaft in a conventional manner, as by the pin 70 shown at the right of FIG. 2. The other roller 32 and sprocket are rotationally fixed but axially movable on shaft 30 to accommodate slight variations of spacing between the two rails. In accordance with a further aspect of the present invention, roller 32 is coupled to the shaft in a manner that permits only limited axial movement, positively preventing removal of the roller from the shaft. An illustrative and preferred structure for that purpose is shown at the left of FIG. 2 and in FIG. 3, utilizing the Woodruff keys 80 which are set in shaft 80 and work in the keyways 82 in the roller bore. Those keyways are blocked at their axially inner ends, as by the rectangular steel blocks 86 which are permanently welded in place as indicated at 87. Blocks 86 allow ample axial movement of the roller on the shaft under all normal conditions. However, if the sprocket teeth should fail to hold the roller on the rail for any reason and the roller is positively trapped on the rail by lip 48 as already described, shaft 30 is prevented from pulling out of the roller by blocks 86. Hence even under the extreme condition of sprocket failure the gate cannot be released from the rails.

Roller 32 is preferably assembled on shaft 30 before roller 34, the shaft being first slid through the bearings 31 to the left as seen in FIG. 2. Roller 32 is then slipped onto the shaft far enough to permit installation of the keys 80 in their recesses in the shaft, after which it is returned to normal position with the keys in keyways 82. Roller 34 is then installed on the shaft and secured, as by pin 70. The axial position of the shaft may be defined with respect to bearings 31, and hence with respect to the gate structure, in any convenient manner. As shown, the collar 88 is positioned by the shoulder 89 formed on shaft 30. The right hand bearing 31 is positively positioned between that collar and roller 34.

To permit installation of shaft 30 in supported relation to the rails, short sections of lower flange 44 are cut out of both rails at opposite points, typically at the center of the car doors in the case of a railway freight car. The gate and shaft are then lifted into position at the cutouts, and the rollers are rolled along the rails with the sprocket teeth engaging the rails in proper mutual relation. The missing flange sections are then preferably welded back into the rails, virtually eliminating any possibility of accidental release of the gate from the rails due to human failure.

As a further safety precaution, the present invention provides at both ends of shaft 30 structure for retaining the gate itself or the gate supporting beam 28 in supported relation to rails 40 and 42 in case of failure of the shaft either between the bearings 31 or between one of the bearings and the roller 32 or 34. As illustratively shown, that structure comprises a flexible cable 90 which is connected at one end to the roller via keeper 60, and at the other end to beam 28 via the rigid extension 94. The ends of the cable are preferably provided with conventional strap fittings 92, which may be conveniently secured to keeper 60 and to extension 94 by the bolts 96. Cables 90 are long enough to be normally slack, but in case of shaft failure they become taut before the gate can fall far enough to cause injury to an operator or damage to freight. Since the rollers are securely trapped by rail lips 48, the gate is prevented from falling free of the rails. Even without rail lip 48, keeper 60 holds the sprocket teeth in engagement with the rail sufficiently securely to support the gate until a broken shaft can be replaced. Cable 90 is typical of any elongated flexible structure, such as a cable, chain or series of coupled links, for example. In a suspension system in which keepers such as 60 are not used, cables 90 may be connected via specially provided members journaled on the sprockets or rollers, or in any manner that permits free shaft rotation under normal conditions.

The Specific rail structure shown for illustration in FIGS. 2 and 3 may be modified in many ways in accordance with the invention. In the alternative form shown in FIG. 4, for example, the upper rail flange 46a is straight, the lip 48 of FIGS. 2 and 3 being omitted, but an opposite offset is provided at 100 in the lower rail flange 44a. That offset lifts the edge portion 102 of the lower flange, on which roller surface 36 rests, toward upper rail 46a. The relatively close spacing of the two flange edge portions, as compared to the root portions near web 41, provides a mouth formation for the longitudinal chamber 43a, which is functionally similar to the mouth of chamber 43 of FIG. 2. That mouth traps the flange 52a of the roller 32a in a manner similar to that already described. Also, the periphery of flange 52a is spaced closely enough to upper rail flange 46a to positively prevent the roller from lifting sufficiently for the sprocket teeth to become disengaged from rail apertures 47.

We claim:

1. In combination with a suspension system for a load dividing gate structure that is releasably lockable at a plurality of positions in a vehicle lading compartment, which system includes two spaced parallel horizontal rails with generally vertical rail webs and generally horizontal rail flanges that extend from the webs inwardly toward each other, and a squaring shaft extending between the rails and carrying at its ends wheel means that include peripheral supporting surfaces riding the respective rail flanges and sprocket formations that are rotationally fixed with respect to the shaft and that engage complementary defining formations on the rail flanges to maintain the shaft axis normally in uniform angular relation to the rails, said gate structure including a gate and means for suspending the gate from the squaring shaft for movement therewith longitudinally of the rails; safety retaining structure comprising a second flange on each rail extending generally horizontally from the rail web in spaced relation above the first said rail flange, the rail web and rail flanges defining a longitudinal chamber, each wheel means including a peripheral wheel flange that is axially spaced outwardly of the sprocket formations and is received in the rail chamber, at least one of the rail flanges having a continuous longitudinal portion that is offset toward the other rail flange between the wheel flange and the sprocket formations to form an elongated chamber mouth of limited vertical width that is less than the diameter of the wheel flange, the limited width of the chamber mouth between the wheel flange and the sprocket formations trapping the wheel flange in the chamber independently of the sprocket formations, and thereby retaining the wheel means in supported relation on the rail despite failure of the sprocket formations.

2. Safety retaining structure as defined in claim 1, said second rail flange being radially spaced above the wheel means by a minimum clearance that exceeds normal variations of spacing between the rail flanges and is less than the depth of penetration of the sprocket formations into said defining formations, thereby limiting upward movement of the wheel means and retaining the sprocket formations in engagement with the defining formations, said retaining structure including also a primary sprocket retainer comprising a member journaled coaxially on the wheel means axially inward of said sprocket formations and having a portion that extends in spaced relation below the edge portion of the lower rail flange, the vertical spacing between the rail and said member portion being less than said minimum clearance between the wheel means and said upper rail flange, whereby the upper rail flange limits upward movement of the wheel means only after failure of the primary sprocket retainer.

3. Safety retaining structure as defined in claim 2, and including also an elongated flexible connector connected at one end to said primary sprocket retainer and at the other end to said gate structure, said connector being normally untensioned and acting to support the gate structure in the event of shaft failure.

4. Safety retaining structure as defined in claim 1, said rails having a row of longitudinally spaced locking apertures through which locking pins are projectable upwardly from the gate to lock the same, and said wheel means having peripheral channels axially outward of the supporting surfaces in position to spacedly receive the ends of the locking pins; and in which said wheel flanges are located axially outward of the wheel channels, and the upper rail includes a downwardly extending lip that projects in spaced relation into the wheel channel and forms said chamber mouth.

5. Safety retaining structure as defined in claim 1, said sprocket formations being integrated with the respective wheel means, and one of said wheel means being mounted in splined relation to the shaft to be axially movable on the shaft to accommodate variations of mutual spacing of said rails; and in which said retaining structure includes positive stop means acting between said axially movable wheel means and the shaft to positively limit the range of said axial movement to positively maintain the wheel means on the shaft.

6. Safety retaining structure as defined in claim 5, and in which said stop means comprise a key set in a recess in the shaft and projecting radially therefrom and slidingly received in an axially extending keyway formed in the wheel means, and structure forming a rigid shoulder substantially filling the keyway adjacent its axially inner end and blocking the key from leaving the keyway axially at said inner end.

7. Safety retaining structure as defined in claim 1, and including also a member journaled coaxially on at least one of the wheel means, and an elongated flexible connector connected at one end to said member and at the other end to said gate structure, said connector being normally untensioned and acting to support the gate structure in the event of shaft failure.

8. In combination with a suspension system for a load dividing gate structure that is releasably lockable at a plurality of positions in a vehicle lading compartment, which system includes two spaced parallel horizontal rails mounted in the compartment, and a squaring shaft extending between the rails and carrying at its ends wheel structures that ride the respective rails and include sprocket formations that are rotationally fixed with respect to the shaft and that engage complementary defining formations on the rails to maintain the shaft axis normally in uniform angular relation to the rails, said gate structure including a gate and means for suspending the gate from the squaring shaft for movement therewith longitudinally of the rails; safety retaining structure comprising flange structure on each rail forming a longitudinal chamber having an elongated chamber mouth of limited vertical width, each wheel structure including at least a portion that is within the chamber and has a diameter exclusive of sprocket formations exceeding the width of the chamber mouth, whereby at least said portion is positively trapped within the rail chamber independently of the sprocket formations, a member journaled coaxially on each of the wheel structures, and elongated flexible connectors connected between the respective members and said gate structure, said connectors being normally untensioned and acting to support the gate structure independently of the sprocket formations in the event of shaft failure.

9. Safety retaining structure as defined in claim 8, and in which said journaled members extend in closely spaced relation to the respective rails in position to normally prevent disengagement of said sprocket formations from said defining formations on the rails.

10. In combination with a suspension system for a loading dividing gate structure that is releasably lockable at a plurality of positions in a vehicle lading compartment, which system includes two spaced parallel horizontal rails, a squaring shaft extending between the rails and carrying at its ends respective wheel structures that ride the respective rails and include sprocket formations that are rotationally fixed with respect to the shaft and that engage complementary defining formations on the rails to maintain the shaft axis normally in uniform angular relation to the rails, at least the wheel structure at one shaft end being mounted in splined relation to the shaft to be axially movable on the shaft through a range of movement to accommodate variations of mutual spacing of the rails, said gate structure including a gate and means for suspending the gate from the squaring shaft for movement therewith longitudinally of the rails; safety retaining structure comprising flange structure on each rail forming a longitudinal chamber having an elongated chamber mouth of limited vertical width, each wheel structure including at least a portion that is within the chamber and has a diameter exclusive of sprocket formations exceeding the width of the chamber mouth, whereby at least said portion is positively trapped within the rail chamber independently of the sprocket formations, and positive stop means acting between said splined wheel structure and the shaft to positively limit said range of wheel structure movement to positively retain the wheel means on the shaft, whereby the shaft end is retained in supported relation to the rail despite failure of sprocket formations.

References Cited
UNITED STATES PATENTS

| | | | |
|---|---|---|---|
| 3,200,773 | 8/1965 | Moorhead | 105—376 |
| 3,241,502 | 3/1966 | Magarian et al. | 105—376 |
| 3,361,086 | 1/1968 | Kessler | 105—376 |
| 3,384,034 | 5/1968 | Loomis et al. | 105—376 |

DRAYTON E. HOFFMAN, Primary Examiner